US012688568B2

(12) United States Patent
Watanabe

(10) Patent No.: US 12,688,568 B2
(45) Date of Patent: Jul. 21, 2026

(54) INUNDATION DAMAGE DETERMINATION DEVICE, INUNDATION DAMAGE DETERMINATION METHOD, AND PROGRAM

(71) Applicant: FUJIFILM Corporation, Tokyo (JP)

(72) Inventor: Kyota Watanabe, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 469 days.

(21) Appl. No.: 18/180,605

(22) Filed: Mar. 8, 2023

(65) Prior Publication Data

US 2023/0222642 A1     Jul. 13, 2023

Related U.S. Application Data

(63) Continuation of application No. PCT/JP2021/033248, filed on Sep. 10, 2021.

(30) Foreign Application Priority Data

Sep. 18, 2020   (JP) ................................. 2020-157126

(51) Int. Cl.
| | |
|---|---|
| *G06T 7/00* | (2017.01) |
| *G01F 23/00* | (2022.01) |
| *G06T 7/50* | (2017.01) |
| *G06T 7/60* | (2017.01) |
| *G06T 7/70* | (2017.01) |

(52) U.S. Cl.
CPC ........ G06T 7/0002 (2013.01); G01F 23/0007 (2013.01); G06T 7/50 (2017.01);
(Continued)

(58) Field of Classification Search
CPC ..................... G06T 7/0002; G06T 7/70; G06T 2207/10028; G06T 2207/20021; G06T 7/73; G01F 23/0007; Y02A 10/40
See application file for complete search history.

(56) References Cited

U.S. PATENT DOCUMENTS

| | | | |
|---|---|---|---|
| 11,587,181 B1 * | 2/2023 | Serrao ................... | G06T 7/0002 |
| 2018/0189749 A1 * | 7/2018 | Takamori ............... | G06Q 10/20 |
| 2020/0090322 A1 * | 3/2020 | Seo ........................ | G06N 3/084 |

FOREIGN PATENT DOCUMENTS

| | | | |
|---|---|---|---|
| CN | 110020469 A * | 7/2019 | ............. G06F 30/20 |
| JP | 2002-269656 A | 9/2002 | |

(Continued)

OTHER PUBLICATIONS

Doi, Masahiro; "River Management System with Applying Multimedia-Reduction of Load on Wide Area Management Work by 4D GIS and Image Processing Technology"; Hitachi Review; vol. 82, No. 3; Mar. 1, 2000; pp. 23-26; re-submitted with a machine translation.
(Continued)

*Primary Examiner* — Andrew M Moyer
*Assistant Examiner* — Conor A O'Malley
(74) *Attorney, Agent, or Firm* — Studebaker Brackett PLLC

(57) ABSTRACT

Provided are an inundation damage determination device, an inundation damage determination method, and a program for determining inundation damage of a house without disposing a sensor in advance or visiting an inundated site. An image including a water surface is acquired, a reference object, which is a reference for a height, is detected from the image, a total length and a position of the reference object are acquired, a length above the water surface of the reference object in the image is measured, and a water level of the water surface is measured from a difference between the total length of the reference object and the length above the water surface of the reference object, the water level of the water surface and the position of the reference object are stored in association with each other, a position of a house, which is a target of an inundation damage determination, is acquired, an inundation water level of the house is decided from the position associated with the water level of the water (Continued)

12

GPS RECEIVER ~20

IMAGING UNIT 14~

28~ COMMUNICATION INTERFACE

ATMOSPHERIC PRESSURE SENSOR ~22

AZIMUTH SENSOR ~24

GYRO SENSOR ~26 surface and the position of the house, and a degree of damage of the house from the inundation water level is determined.

11 Claims, 11 Drawing Sheets

(52) U.S. Cl.
CPC .................. *G06T 7/60* (2013.01); *G06T 7/70* (2017.01); *G06T 2207/10028* (2013.01); *G06T 2207/10032* (2013.01); *G06T 2207/20021* (2013.01); *G06T 2207/30184* (2013.01); *G06T 2207/30244* (2013.01)

(56) References Cited

FOREIGN PATENT DOCUMENTS

| | | | | | |
|---|---|---|---|---|---|
| JP | 2008057994 | A | * | 3/2008 | |
| JP | 2014191483 | A | * | 10/2014 | |
| JP | 6224061 | B2 | * | 11/2017 | .......... G01F 23/292 |
| JP | 2018-040732 | A | | 3/2018 | |
| JP | 2019-087251 | A | | 6/2019 | |
| JP | 2020112945 | A | * | 7/2020 | |
| KR | 101892642 | B1 | * | 10/2018 | ............. G06T 17/05 |
| KR | 20220032332 | A | * | 3/2022 | .......... G06F 16/787 |

OTHER PUBLICATIONS

Doi, Masahiro; "River Management System with Applying Multimedia-Reduction of Load on Wide Area Management Work by 4D GIS and Image Processing Technology"; Hitachi Review; vol. 82, No. 3; Mar. 1, 2000; pp. 23-26.

International Search Report issued in PCT/JP2021/033248; mailed Dec. 7, 2021.

International Preliminary Report On Patentability (Chapter I) and Written Opinion of the International Searching Authority issued in PCT/JP2021/033248; issued Mar. 21, 2023.

* cited by examiner

Figure 4:
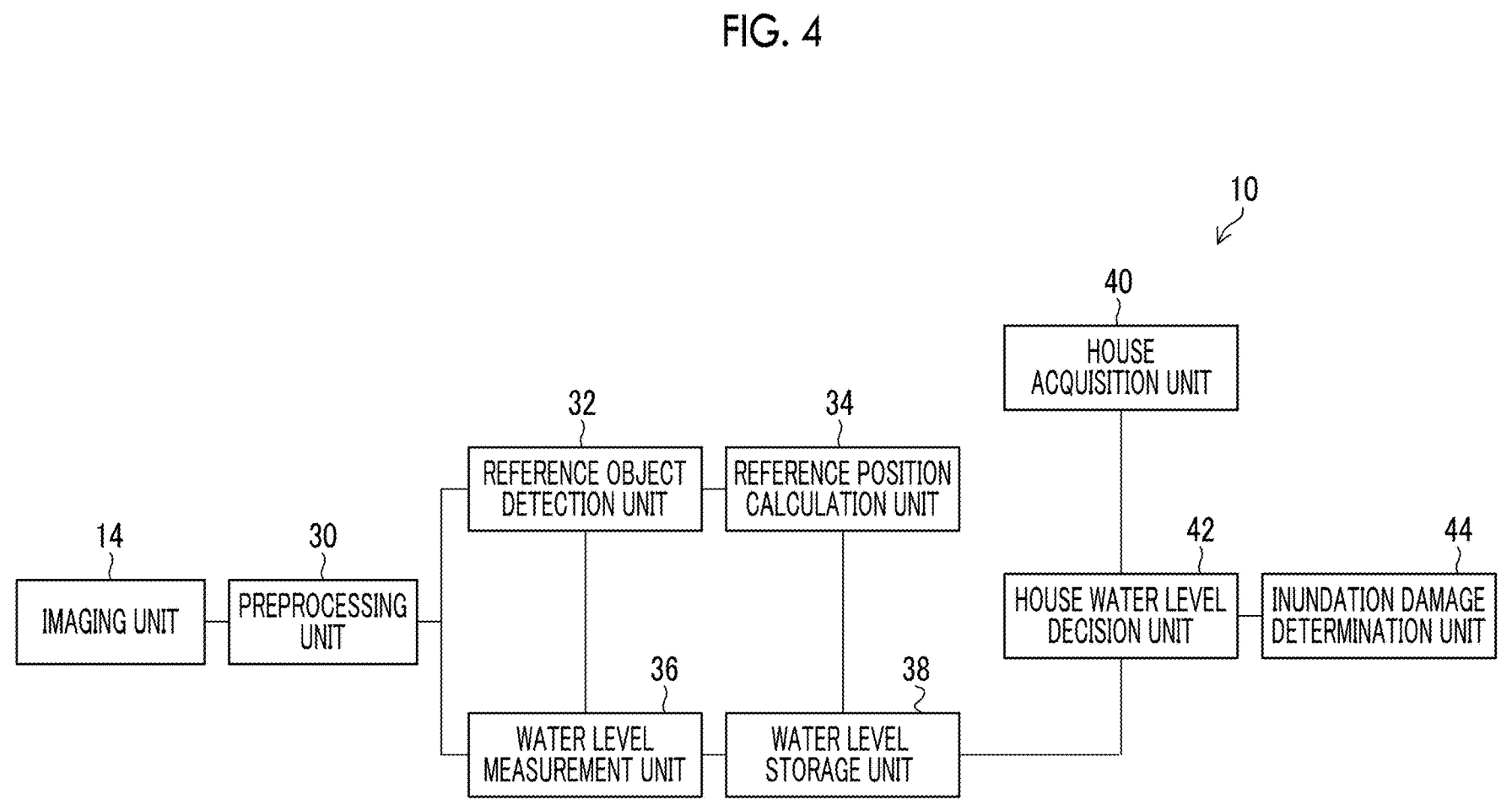

14 IMAGING UNIT

30 PREPROCESSING UNIT

32 REFERENCE OBJECT DETECTION UNIT

34 REFERENCE POSITION CALCULATION UNIT

36 WATER LEVEL MEASUREMENT UNIT

38 WATER LEVEL STORAGE UNIT

40 HOUSE ACQUISITION UNIT

42 HOUSE WATER LEVEL DECISION UNIT

44 INUNDATION DAMAGE DETERMINATION UNIT

| | | | |
|---|---|---|---|
| ☐ | ☐ | ☐ | ☐ |
| COMPLETE DESTRUCTION | LARGE-SCALE HALF DESTRUCTION | HALF DESTRUCTION | NOT HALF DESTRUCTION (PARTIALLY DAMAGED) |
| DAMAGE RATIO OF HOUSE IS 50% OR MORE | DAMAGE RATIO OF HOUSE IS 40% OR MORE | DAMAGE RATIO OF HOUSE IS 20% OR MORE | DAMAGE RATIO OF HOUSE IS LESS THAN 20% |
| INUNDATION OF 1.8 m OR MORE ABOVE FLOOR (MEASUREMENT IN DEEPEST PORTION OF INUNDATED AREA) | INUNDATION OF 1 m OR MORE AND LESS THAN 1.8 m ABOVE FLOOR (MEASUREMENT IN DEEPEST PORTION OF INUNDATED AREA) | INUNDATION LESS THAN 1 m ABOVE FLOOR (MEASUREMENT IN DEEPEST PORTION OF INUNDATED AREA) | UNDERFLOOR INUNDATION (MEASUREMENT IN DEEPEST PORTION OF INUNDATED AREA) |

H₁

OB₂

OB₃

100m

100m

INUNDATION DAMAGE DETERMINATION DEVICE, INUNDATION DAMAGE DETERMINATION METHOD, AND PROGRAM

CROSS-REFERENCE TO RELATED APPLICATIONS

The present application is a Continuation of PCT International Application No. PCT/JP2021/033248 filed on Sep. 10, 2021 claiming priority under 35 U.S.C § 119(a) to Japanese Patent Application No. 2020-157126 filed on Sep. 18, 2020. Each of the above applications is hereby expressly incorporated by reference, in its entirety, into the present application.

BACKGROUND OF THE INVENTION

1. Field of the Invention

The present invention relates to an inundation damage determination device, an inundation damage determination method, and a program, and more particularly to a technique for determining inundation damage of a house.

2. Description of the Related Art

In recent years, heavy rainfall has occurred frequently, and a risk of damage by the flood disaster has been increased. JP2019-87251A discloses a technique of detecting the presence or absence of inundation and a water level by a sensor connected to a network and notifying the server of the presence or absence of inundation and the water level in order to provide appropriate information during heavy rainfall.

SUMMARY OF THE INVENTION

A disaster certificate certifying a degree of damage will be issued to a house damaged by the flood disaster. The degree of damage by the flood disaster is classified according to an inundated depth of the house, but in a case of a widespread disaster, the number of inundated houses is enormous, and a manual survey takes a lot of time. Moreover, since water is drawn with time passage from the flood disaster, it is difficult to determine the inundation.

In JP2019-87251A, water level measurement is automated by installing an inundation detection sensor in the downtown, but it is essential to install the sensor in advance, and there is a possibility that the sensor itself may be damaged and may not function during a disaster.

The present invention has been made in view of such circumstances, and is to provide an inundation damage determination device, an inundation damage determination method, and a program for determining inundation damage of a house without disposing a sensor in advance or visiting an inundated site.

In order to achieve the object described above, one aspect of the present invention relates to an inundation damage determination device comprising a memory that stores a command to be executed by a processor, and the processor that executes the command stored in the memory, in which the processor acquires an image including a water surface, detects a reference object, which is a reference for a height, from the image, acquires a total length and a position of the reference object, measures a length above the water surface of the reference object in the image and measures a water level of the water surface from a difference between the total length of the reference object and the length above the water surface of the reference object, stores the water level of the water surface and the position of the reference object in association with each other, acquires a position of a house which is a target of an inundation damage determination, decides an inundation water level of the house from the position associated with the water level of the water surface and the position of the house, and determines a degree of damage of the house from the inundation water level.

According to the present aspect, since the water level of the water surface is measured from the image including the water surface and the reference object, the inundation damage of the house can be determined without disposing the sensor in advance or visiting the inundated site.

It is preferable that the processor acquire a height and an angle of view of a camera that captures the image, and calculate the length above the water surface of the reference object in the image based on the height and the angle of view of the camera. As a result, the length above the water surface of the reference object in the image can be appropriately measured.

It is preferable that the processor acquire information of a lens of the camera, and perform distortion correction processing of the lens on the image. As a result, the length above the water surface of the reference object in the image can be appropriately measured.

It is preferable that the processor acquire the latitude, the longitude, and the altitude of the reference object, and acquire the latitude, the longitude, and the altitude of the house. As a result, the inundation water level of the house can be appropriately decided.

It is preferable that the processor use, as the inundation water level of the house, a highest water level among water levels of the water surface at positions of a plurality of the reference objects located within a certain distance from the position of the house. As a result, the inundation water level of the house can be appropriately decided.

It is preferable that, in a case in which the image is an image of a plain area, the processor divide the area into a plurality of regions and use, as the inundation water level of the house, a water level of the water surface at a position of the reference object closest to the house among the reference objects located within the same region as the house. As a result, in a case in which the image is the image of the plain area, the inundation water level of the house can be appropriately decided.

It is preferable that, in a case in which the image is an image of a rough area, the processor use, as the inundation water level of the house, a water level of the water surface at a position of the reference object closest to the house among the reference objects located at the same altitude as altitude of the house. As a result, in a case in which the image is the image of the rough area, the inundation water level of the house can be appropriately decided.

It is preferable that, in a case in which a boundary between the reference object and the water surface is not shown in the image, a water level of the water surface at the position of the reference object be measured by using a depth map. As a result, even in a case in which the boundary between the reference object and the water surface is not shown in the image, the water level of the water surface can be appropriately measured.

It is preferable that the image be an image captured by a night vision camera. As a result, the degree of damage of the house can be determined even at night without light.

It is preferable that the image be an image captured by a camera mounted on a flying object. As a result, the image of the inundated site can be appropriately acquired.

In order to achieve the object described above, another aspect of the present invention relates to an inundation damage determination method comprising an image acquisition step of acquiring an image including a water surface, a reference object detection step of detecting a reference object, which is a reference for a height, from the image, a reference object information acquisition step of acquiring a total length and a position of the reference object, a measurement step of measuring a length above the water surface of the reference object in the image and measuring a water level of the water surface from a difference between the total length of the reference object and the length above the water surface of the reference object, a storage step of storing the water level of the water surface and the position of the reference object in association with each other, a house information acquisition step of acquiring a position of a house which is a target of an inundation damage determination, an inundation water level decision step of deciding an inundation water level of the house from the position associated with the water level of the water surface and the position of the house, and a damage determination step of determining a degree of damage of the house from the inundation water level.

According to the present aspect, since the water level of the water surface is measured from the image including the water surface and the reference object, the inundation damage of the house can be determined without disposing the sensor in advance or visiting the inundated site.

In order to achieve the object described above, still another aspect of the present invention relates to a program causing a computer to execute the inundation damage determination method described above. A computer-readable non-transitory recording medium on which the program is recorded may also be included in the present aspect.

According to the present aspect, since the water level of the water surface is measured from the image including the water surface and the reference object, the inundation damage of the house can be determined without disposing the sensor in advance or visiting the inundated site.

According to the present invention, the inundation damage of the house can be determined without disposing the sensor in advance or visiting the inundated site.

BRIEF DESCRIPTION OF THE DRAWINGS

FIG. 4 is a functional block diagram of the inundation damage determination system.

FIG. 5 is a diagram showing a height of a traffic light as an example of a reference object.

FIG. 7 is a diagram showing an example of a relationship between an inundation height (water level) and a degree of damage.

DESCRIPTION OF THE PREFERRED EMBODIMENTS

Hereinafter, preferred embodiments of the present invention will be described in detail with reference to the accompanying drawings.

[Overall Configuration of Inundation Damage Determination System]

Figure 1:
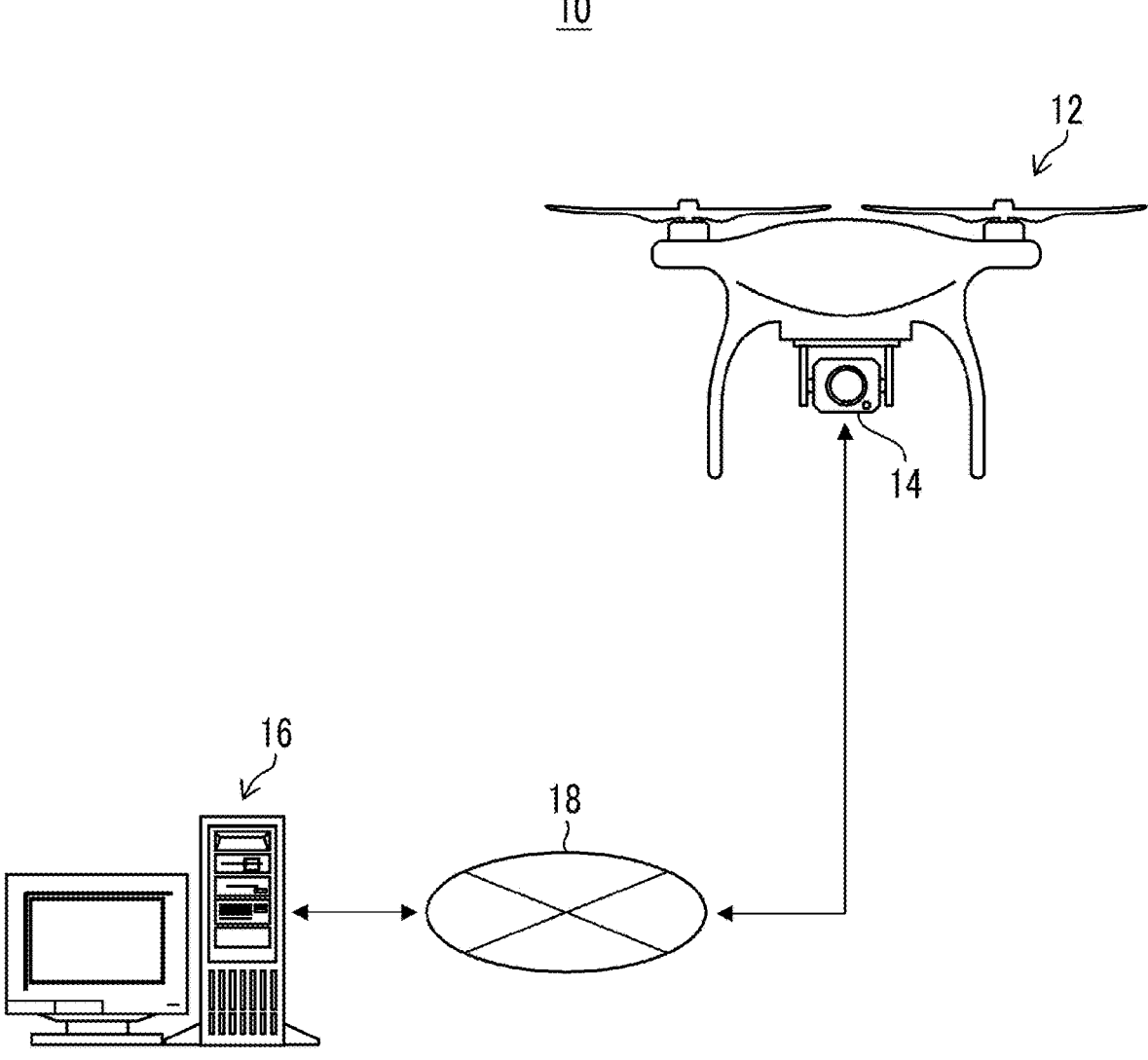
FIG. 1 is a schematic diagram of an inundation damage determination system.

FIG. 1 is a schematic diagram of an inundation damage determination system 10 according to the present embodiment. As shown in FIG. 1, the inundation damage determination system 10 includes a drone 12 and a server 16.

The drone 12 is an unmanned aerial vehicle (UAV, an example of a flying object) which is remotely operated by a server 16 or a controller (not shown). The drone 12 may have an auto-pilot function of flying according to a predetermined program.

The drone 12 comprises an imaging unit 14. The imaging unit 14 is a camera comprising a lens (not shown) and an imaging element (not shown). The imaging unit 14 is supported by the drone 12 via a gimbal (not shown). The lens of the imaging unit 14 images received subject light on an imaging plane of the imaging element. The imaging element of the imaging unit 14 receives the subject light imaged on the imaging plane and outputs an image signal of a subject.

The server 16 is implemented by at least one computer, and constitutes an inundation damage determination device. The drone 12 and the server 16 are connected to each other to be able to transmit and receive data via a communication network 18, such as a 2.4 GHz band wireless local area network (LAN).

[Configuration of Drone]

Figure 2:
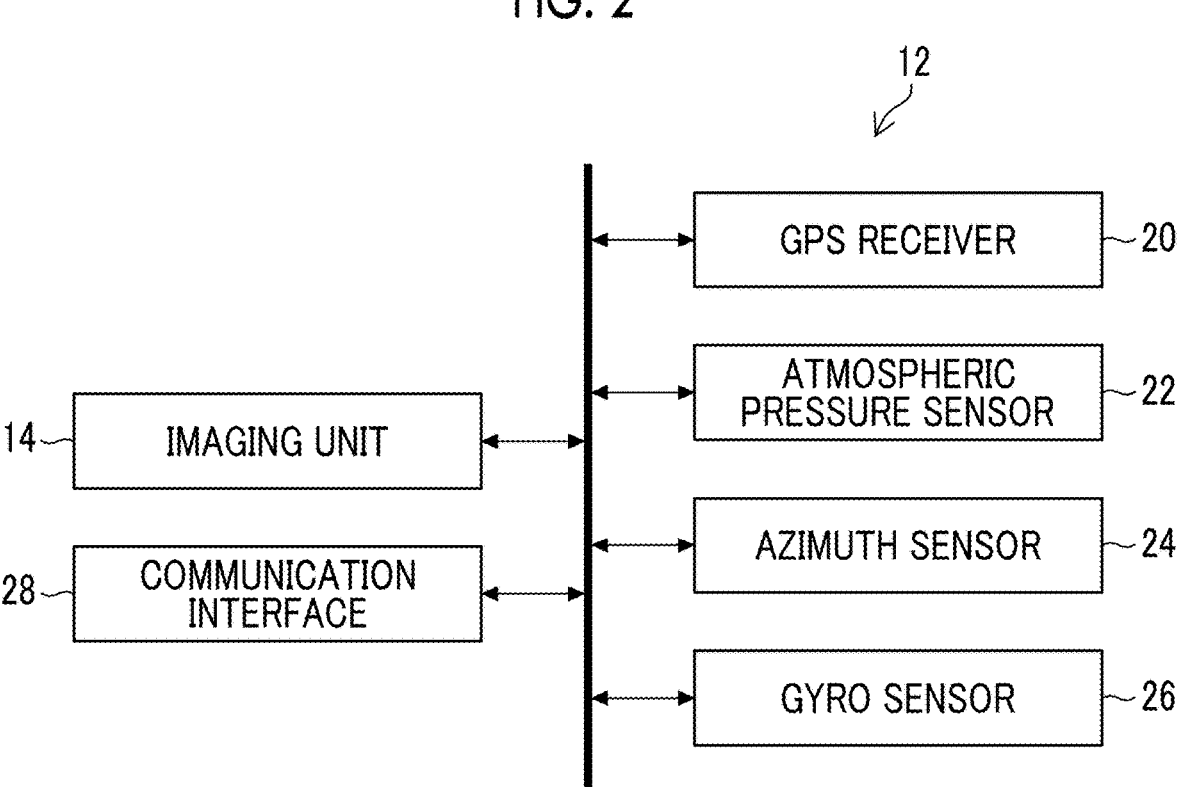
FIG. 2 is a block diagram showing a configuration of a drone.

FIG. 2 is a block diagram showing a configuration of the drone 12. As shown in FIG. 2, the drone 12 comprises a global positioning system (GPS) receiver 20, an atmospheric pressure sensor 22, an azimuth sensor 24, a gyro sensor 26, and a communication interface 28, in addition to the imaging unit 14.

The GPS receiver 20 acquires positional information of the latitude and the longitude of the drone 12. The atmospheric pressure sensor 22 acquires altitude information of the drone 12 from the detected atmospheric pressure. The azimuth sensor 24 acquires an orientation of the drone 12 from the detected azimuth. The gyro sensor 26 acquires posture information of the drone 12 from the detected angles of a roll axis, a pitch axis, and a yaw axis. The communication interface 28 controls communication via the communication network 18.

The drone 12 may acquire information on a remaining amount of a battery (not shown). Moreover, the imaging unit 14 may acquire the angles of the roll axis, the pitch axis, and the yaw axis of an optical axis of a lens by the gyro sensor (not shown) provided in the imaging unit 14.

[Configuration of Server]

Figure 3:
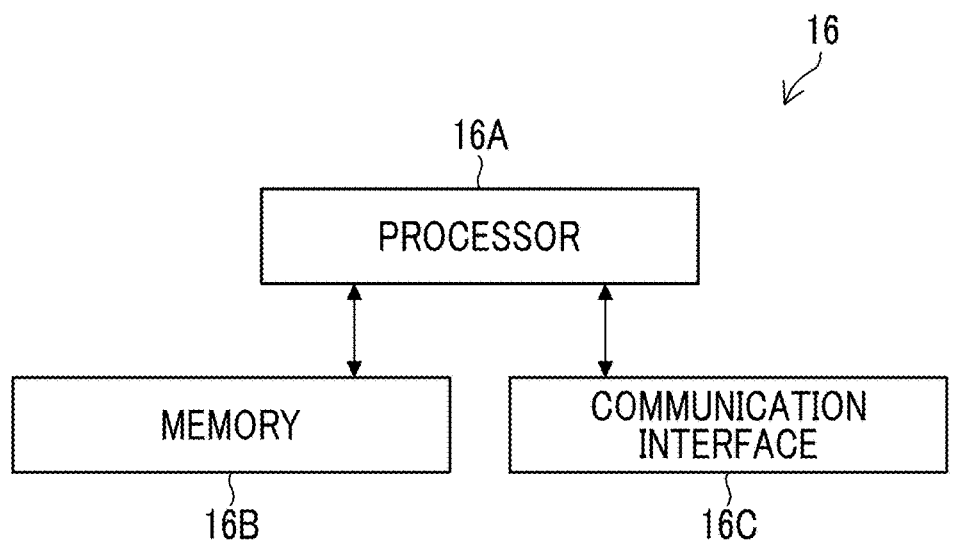
FIG. 3 is a block diagram showing a configuration of a server.

FIG. 3 is a block diagram showing a configuration of the server 16. The server 16 comprises a processor 16A, a memory 16B, and a communication interface 16C.

The processor 16A executes a command stored in the memory 16B. A hardware structure of the processor 16A is various processors as shown below. Various processors include a central processing unit (CPU) as a general-purpose processor which functions as various function units by executing software (program), a graphics processing unit (GPU) as a processor specialized in image processing, a programmable logic device (PLD) as a processor of which a circuit configuration can be changed after manufacture, such as a field programmable gate array (FPGA), and a dedicated electric circuit as a processor which has a circuit configuration specifically designed to execute specific processing, such as an application specific integrated circuit (ASIC).

One processing unit may be composed of one of these various processors, or two or more processors of the same type or different types (for example, a plurality of FPGAs, or a combination of a CPU and an FPGA, or a combination of a CPU and a GPU). Moreover, a plurality of function units may be composed of one processor. As a first example in which the plurality of function units is composed of one processor, as represented by a computer such as a client or a server, there is a form in which one processor is composed of a combination of one or more CPUs and software, and this processor operates as the plurality of function units. As a second example thereof, as represented by a system on chip (SoC), there is a form in which a processor that implements the functions of the entire system including the plurality of function units by one integrated circuit (IC) chip is used. As described above, various function units are composed of one or more of the various processors described above as the hardware structure.

Further, the hardware structures of these various processors are, more specifically, an electric circuit (circuitry) in which circuit elements such as semiconductor elements are combined.

The memory 16B stores the command executed by the processor 16A. The memory 16B includes a random access memory (RAM) and a read only memory (ROM) (not shown). The processor 16A uses the RAM as a work region, executes software by using various programs and parameters including an inundation damage determination program stored in the ROM, and uses the parameters stored in the ROM or the like to execute various pieces of processing of the server 16.

The communication interface 16C controls communication via the communication network 18.

[Functional Configuration of Inundation Damage Determination System]

FIG. 4 is a functional block diagram of the inundation damage determination system 10. As shown in FIG. 4, the inundation damage determination system 10 comprises the imaging unit 14, a preprocessing unit 30, a reference object detection unit 32, a reference position calculation unit 34, a water level measurement unit 36, a water level storage unit 38, a house acquisition unit 40, a house water level decision unit 42, and an inundation damage determination unit 44. The functions of the preprocessing unit 30, the reference object detection unit 32, the reference position calculation unit 34, the water level measurement unit 36, the water level storage unit 38, the house acquisition unit 40, the house water level decision unit 42, and the inundation damage determination unit 44 are implemented by the server 16.

The preprocessing unit 30 is an image processing device that performs preprocessing on the image acquired from the imaging unit 14. The preprocessing unit 30 acquires lens information including distortion information of the lens of the imaging unit 14, and performs distortion correction processing of correcting distortion of the lens by a technique known as preprocessing.

From the image preprocessed by the preprocessing unit 30, the reference object detection unit 32 uses a known technique, such as deep learning, to detect a reference object which is a reference for a height and is partially below the water surface. The reference object is an object for which a standard, such as a total length, is predetermined, and is, for example, an electric pole, a traffic light, a mail post, and a road sign. The reference object can be used as a yardstick in a case of measuring a length by using the height thereof.

The reference object detection unit 32 acquires the height of the reference object detected from the image. Data of the height of each reference object is stored in advance in the memory 16B of the server 16. The reference object detection unit 32 may acquire the height of the reference object from a database (not shown) or the like via the communication interface 16C of the server 16.

The reference position calculation unit 34 collates the reference object detected by the reference object detection unit 32 with map data, and specifies a position including the latitude and the longitude of the reference object and the altitude. The map data may be stored in advance in the memory 16B, or may be acquired from the database (not shown) or the like via the communication interface 16C. Geographical positions of the electric pole, the traffic light, and the mail post are acquired in advance from paid or free data held by an electric power company, a police in charge, a post office, and the like.

The water level measurement unit 36 detects the water surface at a position of the reference object from the image preprocessed by the preprocessing unit 30, and measures a length above the water surface of the reference object. Moreover, the water level measurement unit 36 measures the water level at the position of the reference object from a difference between the height of the reference object and the length above the water surface of the reference object.

The water level storage unit 38 stores the water level measured by the water level measurement unit 36 as water level history data in association with the position and the altitude of the reference object specified by the reference position calculation unit 34.

The house acquisition unit 40 acquires information on a house which is a target of an inundation damage determination. The house information includes a position including the latitude and the longitude of the house and an altitude. The house information may be stored in advance in the memory 16B, or may be acquired from the database (not shown) or the like via the communication interface 16C.

The house water level decision unit 42 decides an inundation water level of the house which is the target of the inundation damage determination. In order to decide the inundation water level of the target house, the house water level decision unit 42 searches for water level data corresponding to the house from the water level history data stored in the water level storage unit 38.

The inundation damage determination unit 44 determines a degree of damage from the inundation water level of the house decided by the house water level decision unit 42. As a determination criterion, a predetermined criterion for a value of the inundation water level is used. In a case in which an error is included in the inundation water level decided by the house water level decision unit 42 and a result of the damage determination is changed due to consideration of the error, a determination result having a larger degree of damage (having advantage to the inhabitant) is adopted.

The inundation damage determination system 10 may comprise a determination result transmission unit (not shown) that transmits the determination result of the inundation damage determination unit 44 to a computer, an information portable terminal, or the like of a user via the communication interface 16C. The inundation damage determination system 10 may comprise a determination result display unit that displays the determination result of the inundation damage determination unit 44 on a display (not shown).

[Height of Reference Object]

Figure 5:
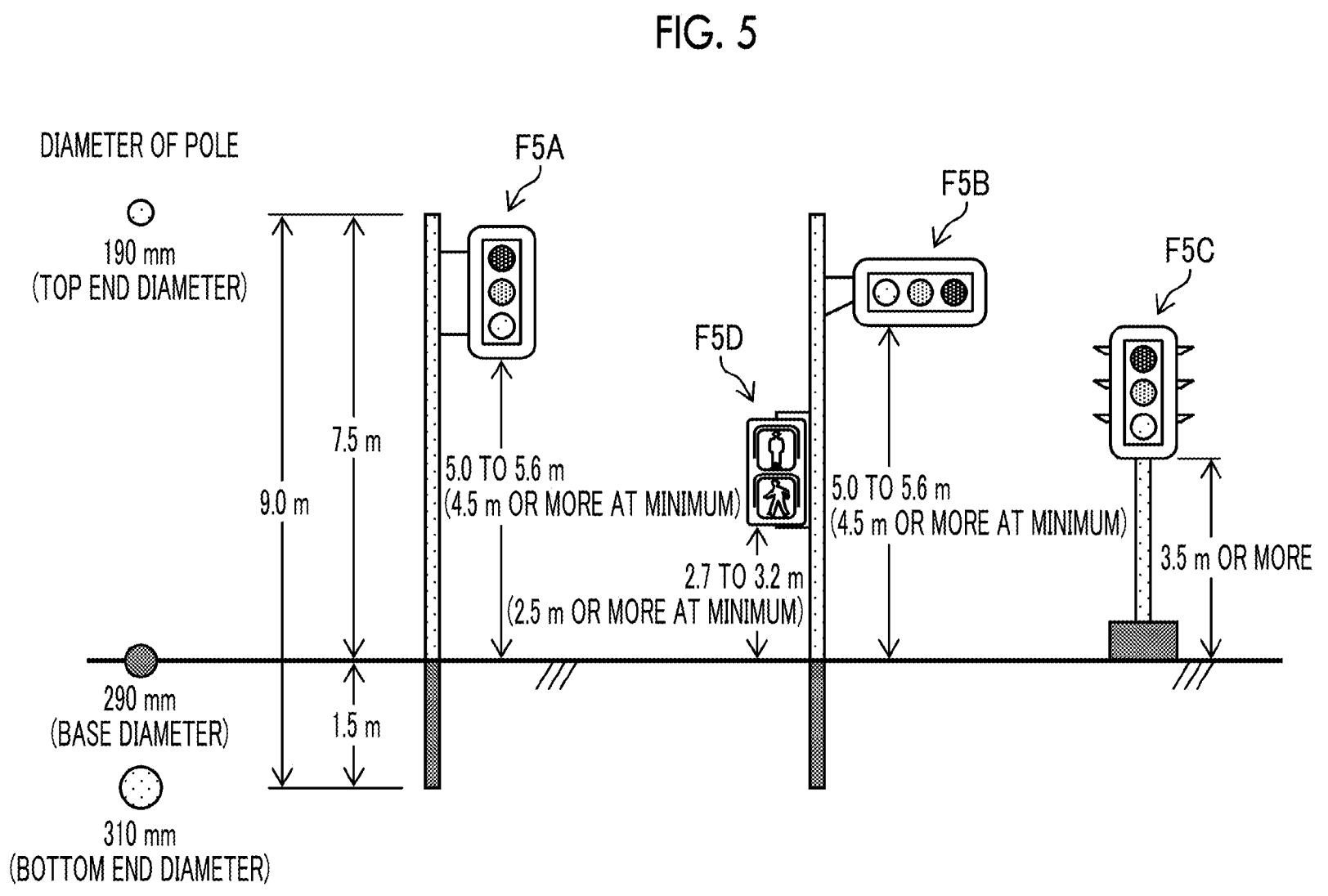

FIG. 5 is a diagram showing a height of the traffic light as an example of the reference object. A portion of F5A in FIG. 5 shows a cantilever type vertical traffic light for a vehicle, and a portion of F5B in FIG. 5 shows a cantilever type horizontal traffic light for the vehicle. As shown in F5A and F5B, the height of the traffic light for the vehicle is defined to be 4.5 m or more from the ground to the bottom of lighting instrument, and is generally 5.0 m to 5.6 m in most cases.

A portion of F5C in FIG. 5 indicates a central pole type vertical traffic light for the vehicle. As shown in F5C, the height of the central pole type traffic light is 3.5 m or more. Moreover, a portion of F5D in FIG. 5 indicates a traffic light for a pedestrian. As shown in F5D, the height of the traffic light for the pedestrian is defined to be 2.5 m or more from the ground to the bottom of lighting instrument, and is generally 2.7 m to 3.2 m in most cases.

It should be noted that, as shown in F5A, a standard length of a signal pole to which the traffic light is attached is 9 m, 1.5 m below the ground, and 7.5 m above the ground. Moreover, a standard diameter of the signal pole is 190 mm for a top end diameter, 290 mm for a base diameter, and 310 mm for a bottom end diameter. The inundation damage determination system 10 may treat the traffic light including the signal pole as the reference object, or may treat the signal pole as the reference object.

Figure 6:
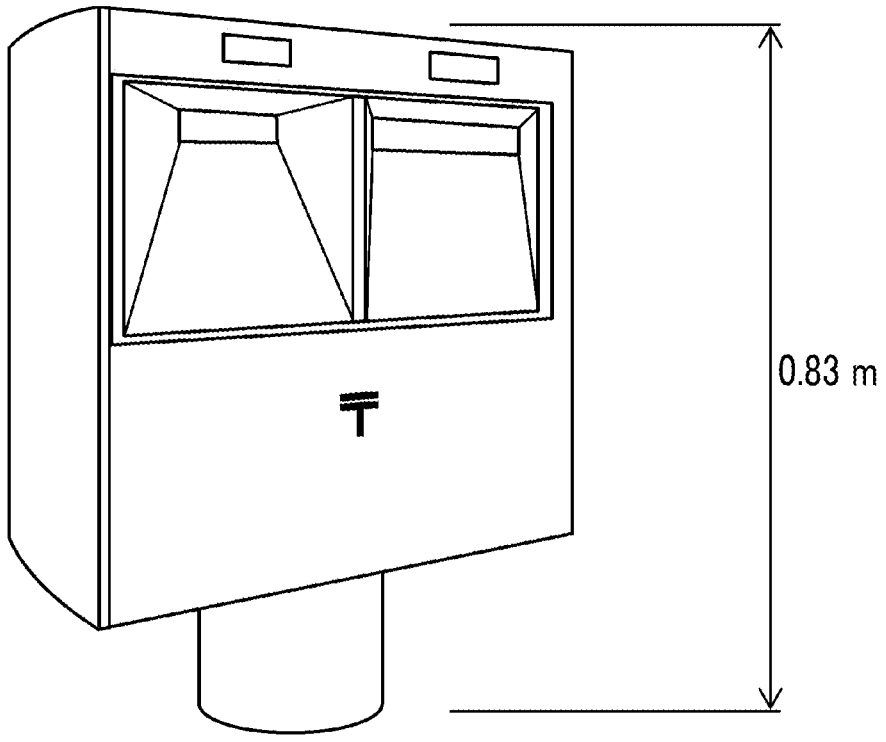
FIG. 6 is a diagram showing a height of a mail post (mail delivery box) as another example of the reference object.

FIG. 6 is a diagram showing a height of the mail post (mail delivery box) as another example of the reference object. FIG. 6 shows a number-13 mail delivery box, which is characterized by two insertion holes and the legs of a square pillar. The height of the number-13 mail delivery box from the ground to the top is 0.83 m.

[Determination of Inundation Damage]

As the determination criterion for the inundation damage performed by the inundation damage determination unit 44, a predetermined criterion for the inundation water level value is used. FIG. 7 is a diagram showing an example of a relationship between an inundation height (water level) and a degree of damage. The inundation damage is classified into four stages of "complete destruction", "large-scale half destruction", "half destruction", and "non-half destruction (partially damaged)".

In a case of the determination based on the inundation height, a residence being washed away or the inundation of 1.8 m or more above the floor is classified as "complete destruction", the inundation of 1 m or more and less than 1.8 m above the floor is classified as "large-scale half destruction", the inundation less than 1 m above the floor is classified as "half destruction", and underfloor inundation is classified as "non-half destruction". It should be noted that the inundation height here is a value measured in the deepest portion of an inundated area.

Moreover, in a case of the determination based on a damage ratio of the residence, a case in which the damage ratio is 50% or more is classified as "complete destruction", a case in which the damage ratio is 40% or more and less than 50% is classified as "large-scale half destruction", a case in which the damage ratio is 20% or more and less than 40% is classified as "half destruction", and a case in which the damage ratio is less than 20% is classified as "non-half destruction".

Inundation Damage Determination Method: First Embodiment

Figure 8:
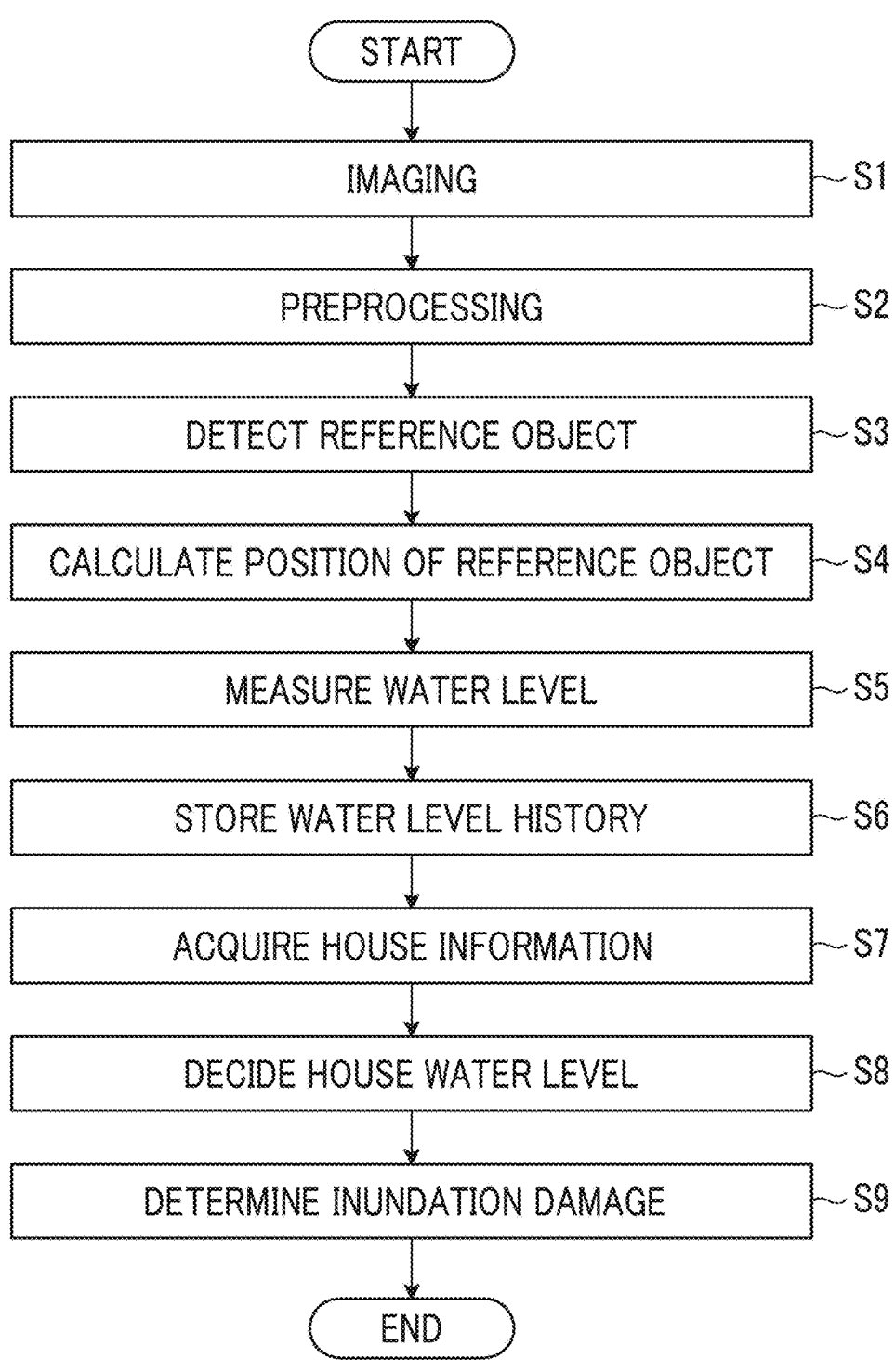
FIG. 8 is a flowchart showing each step of an inundation damage determination method.

FIG. 8 is a flowchart showing each step of an inundation damage determination method by the inundation damage determination system 10. The inundation damage determination method is implemented by executing the inundation damage determination program stored in the memory 16B by the processor 16A. The inundation damage determination program may be provided by a computer-readable non-transitory recording medium. In this case, the server 16 may read the inundation damage determination program from the non-transitory recording medium and store the inundation damage determination program in the memory 16B.

In step S1 (an example of an image acquisition step), the drone 12 flies over the city immediately after the occurrence of the flood in response to an instruction of the server 16, and the imaging unit 14 captures an inundation situation from the sky above the city. The imaging unit 14 transmits the captured image to the server 16. The server 16 receives the image.

In step S2, the preprocessing unit 30 performs the preprocessing of correcting the distortion of the lens of the imaging unit 14 on the image received from the imaging unit 14.

In step S3 (an example of a reference object detection step), the reference object detection unit 32 detects the reference object, which is the reference for the height, from the image preprocessed in step S2. It should be noted that there is a possibility that the detected reference object includes an object that has collapsed due to the disaster. Therefore, an inclination of the detected reference object with respect to a vertical direction is examined, and the object having the inclination with respect to the vertical direction is excluded. Moreover, in a case in which a plurality of reference objects is detected, an object closest to the center of the image is adopted as the reference object in order to avoid an influence of the lens distortion.

In step S4 (an example of a reference object information acquisition step), the reference position calculation unit 34 collates the reference object detected in step S3 with the map data, and specifies the latitude, the longitude, and the altitude of the reference object. The reference position calculation unit 34 may specify the latitude, the longitude, and the altitude of the reference object by using the positional information of the drone 12 acquired from the GPS receiver 20 of the drone 12.

Moreover, the reference object detection unit 32 acquires the height of the reference object for which the latitude, the longitude, and the altitude are specified from the memory 16B (an example of a reference object information acquisition step). For example, in a case in which the reference object is the number-13 mail delivery box, 0.83 m is acquired as the height of the reference object, as shown in FIG. 6.

In step S5 (an example of a measurement step), the water level measurement unit 36 measures the length of the reference object (an example of a length above the water surface) protruding from the water surface from the image preprocessed in step S2. The length of the reference object is measured by using Expression 1 below.

(Length of reference object protruding from water surface)=(Number of pixels of reference object protruding from water surface)×(Length in image per pixel)   (Expression 1)

Here, the length in the image per pixel is a value decided by a resolution of the imaging element of the imaging unit 14 and an angle of view of the lens. Therefore, the water level measurement unit 36 acquires information on the resolution of the imaging unit 14 and the angle of view of the lens in advance.

Moreover, in a case in which the imaging unit 14 images the reference object with the elevation angle (pitch angle) 0, it is necessary to correct an influence of the elevation angle θ of the number of pixels of the reference object protruding from the water surface.

Figure 9:
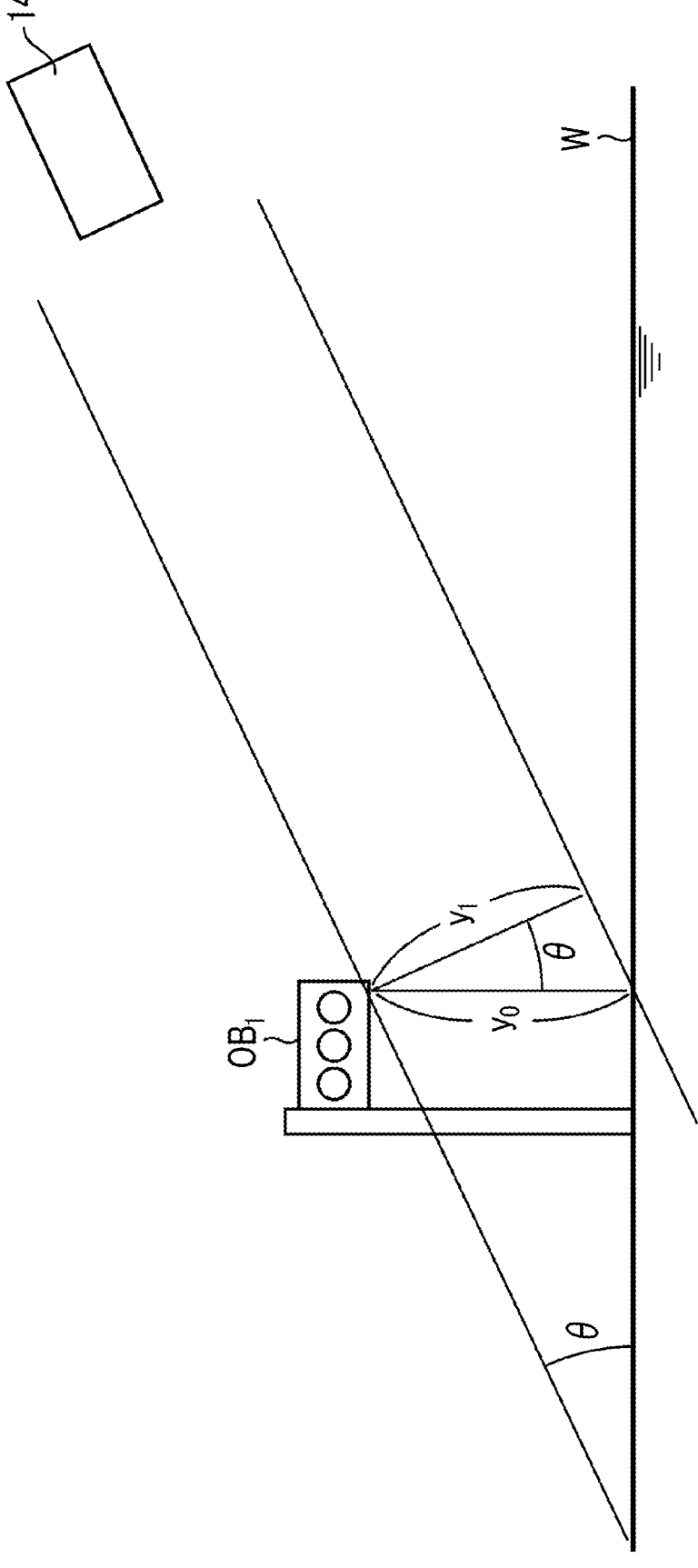
FIG. 9 is a diagram for describing an influence of the height of the reference object by an elevation angle θ.

FIG. 9 is a diagram for describing the influence of the elevation angle θ of the height of the reference object protruding from a water surface W. As shown in FIG. 9, in a case in which a reference object $OB_1$ of which an actual height protruding from the water surface W is $y_0$ is imaged by the imaging unit 14 having the elevation angle θ, a height $y_1$ protruding from the water surface W of the reference object $OB_1$ in the image is represented by Expression 2 below.

$$y_1 = y_0 \times \cos \theta \quad \text{(Expression 2)}$$

The elevation angle θ can be acquired from the gyro sensor provided in the drone 12 and the imaging unit 14.

Moreover, the water level measurement unit 36 measures the water level at the position of the reference object from the difference between the height of the reference object and the length of the reference object protruding from the water surface. In a case in which the height of the reference object includes an error in the standard, a value of the inundation height is also held in a form including the error.

Returning to the description of FIG. 8, in step S6 (an example of a storage step), the water level storage unit 38 stores the water level measured in step S5 as water level history data in association with the latitude, the longitude, and the altitude of the reference object acquired in step S4. The inundation damage determination system 10 repeats the processing of steps S1 to S6 within a range of the city (disaster area) in which the flood has occurred.

In step S7 (an example of a house information acquisition step), the house acquisition unit 40 acquires the information on the house including the latitude, the longitude, and the altitude of the house which is the target of the inundation damage determination.

In step S8 (an example of an inundation water level decision step), the house water level decision unit 42 decides the inundation water level of the house. In order to decide the inundation water level of the target house, the house water level decision unit 42 searches for water level data corresponding to the house from the water level history data stored in the water level storage unit 38.

As a search method, the house water level decision unit 42 acquires the water level history data within a certain distance from the position of the house. In a case in which the number of search results is 0 and the water level history data cannot be acquired, the house water level decision unit 42 decides that the water level of the house cannot be determined and terminates the processing of the present flowchart.

Next, the house water level decision unit 42 excludes the water level history data at the altitude different from the altitude of the house by a certain value or more from the water level history data acquired by the search. In a case in which the remaining water level history data is 0, the house water level decision unit 42 decides that the water level of the house cannot be determined and terminates the processing of the present flowchart. The house water level decision unit 42 adopts, as the inundation water level of the house, data having a highest water level advantageous to the inhabitant of the house among the remaining water level history data. The house water level decision unit 42 may adopt, as the inundation water level of the house, the water level history data associated with the reference object closest to the target house among the remaining water level history data.

In step S9 (an example of a damage determination step), the inundation damage determination unit 44 determines the degree of damage to the house from the inundation water level of the house decided in step S8. The inundation damage determination unit 44 determines the damage using, for example, the determination criterion shown in FIG. 7.

As described above, with the inundation damage determination method, the inundation damage of the house can be determined without disposing the sensor or visiting the inundated site in advance.

Second Embodiment

Figures 10, 11:
FIG. 10 is an example of an image captured by a night vision camera.
FIG. 11 is a diagram showing a positional relationship between a house, which is a target house, and two reference objects on a map.

In a case in which the image is captured by the drone 12 at night, a night vision camera, such as an infrared camera, is used as the imaging unit 14. The infrared camera is a camera that captures the image according to the intensity of detected infrared rays. By disposing a visible light cut filter that transmits infrared light and cuts visible light in the imaging unit 14, the imaging unit 14 may be used as the infrared camera. FIG. 10 is an example of the image captured by the night vision camera.

Third Embodiment

In a case in which the disaster area is a plain (an example of a case in which the image is an image of a plain area), the house water level decision unit 42 divides the area into a 100 m mesh (an example of a plurality of regions) and uses, as the inundation water level of the house, the water level of the reference object closest to the house among the reference objects located within the same mesh as the house which is the target of the inundation damage determination.

FIG. 11 is a diagram showing a positional relationship between a house $H_1$ which is the target house, and a reference object $OB_2$ and a reference object $OB_3$ on a map. Here, the house $H_1$ and the reference object $OB_2$ are located within the same mesh, and the house $H_1$ and the reference object $OB_3$ are located within different meshes. Therefore, the house water level decision unit 42 decides the inundation water level of the house $H_1$ by using the water level history data at the position of the reference object $OB_2$.

Fourth Embodiment

In a case in which the disaster area is a rough land (an example in a case in which the image is an image of a rough area), the house water level decision unit 42 uses, as the inundation water level of the house, the water level of the water surface of the reference object closest to the house among the reference objects located at the same altitude as the altitude of the house which is the determination target of the inundation damage on the contour line.

Figure 12:
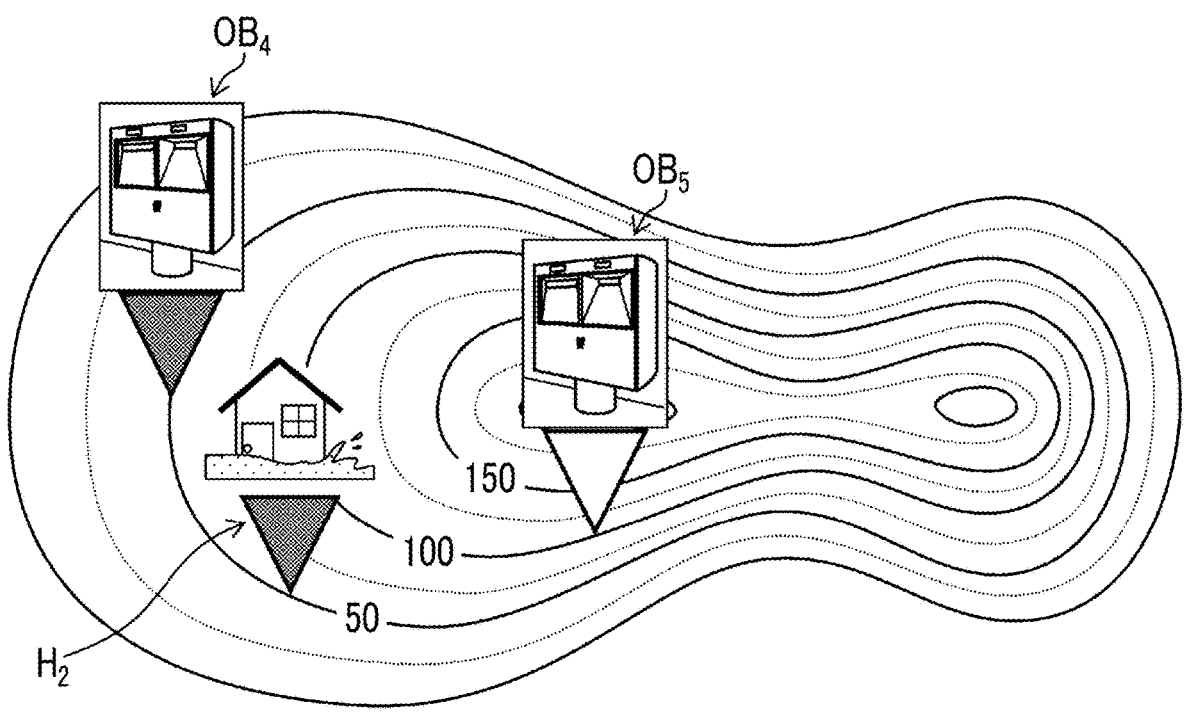
FIG. 12 is a diagram showing a positional relationship between the house, which is the target house, and two reference objects on the map.

FIG. 12 is a diagram showing a positional relationship between a house $H_2$ which is the target house, and a reference object $OB_4$ and a reference object $OB_5$ on the map. Here, the house $H_2$ and the reference object $OB_4$ are located at the same altitude on the contour line, and the house $H_2$ and the reference object $OB_5$ are located at different altitudes. Therefore, the house water level decision unit 42 decides the inundation water level of the house $H_2$ by using the water level history data at the position of the reference object $OB_4$.

Fifth Embodiment

Figure 13:
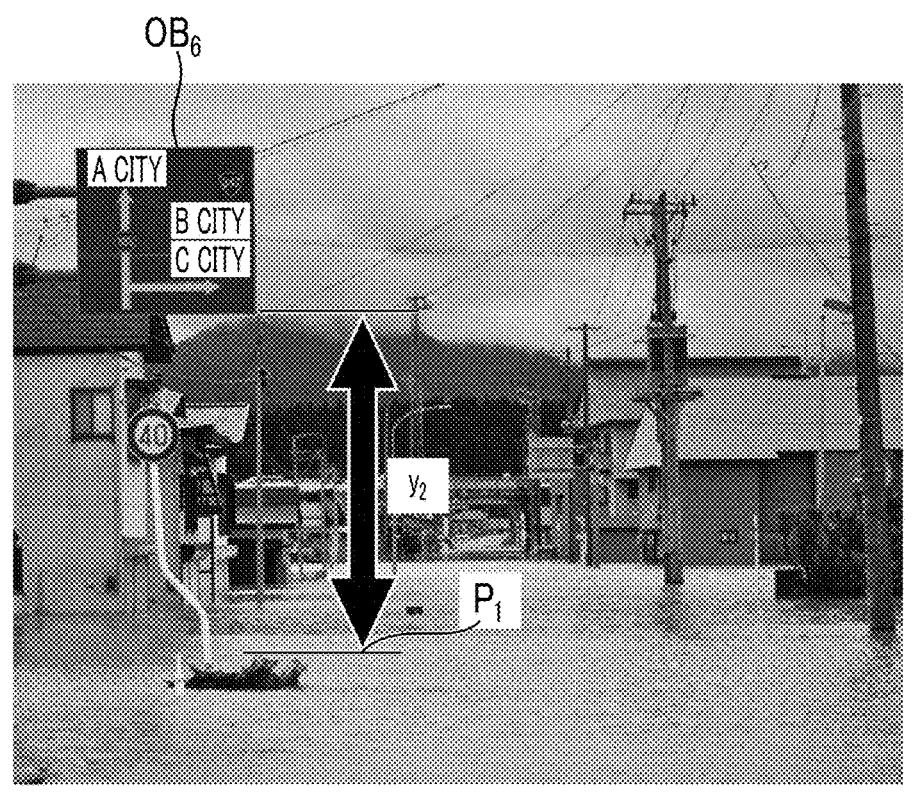
FIG. 13 is an example of an image in which a boundary between the reference object and the water surface is not shown in the image.

FIG. 13 is an example of an image in which a boundary between the reference object and the water surface is not shown in the image. In FIG. 13, a support pole of a traffic sign, which is a reference object $OB_6$, is not shown in the image. Therefore, in order to measure a distance $y_2$ between the reference object $OB_6$ and the water surface immediately below the reference object $OB_6$, it is necessary to specify a water surface position $P_1$ immediately below the reference object $OB_6$.

Figure 14:
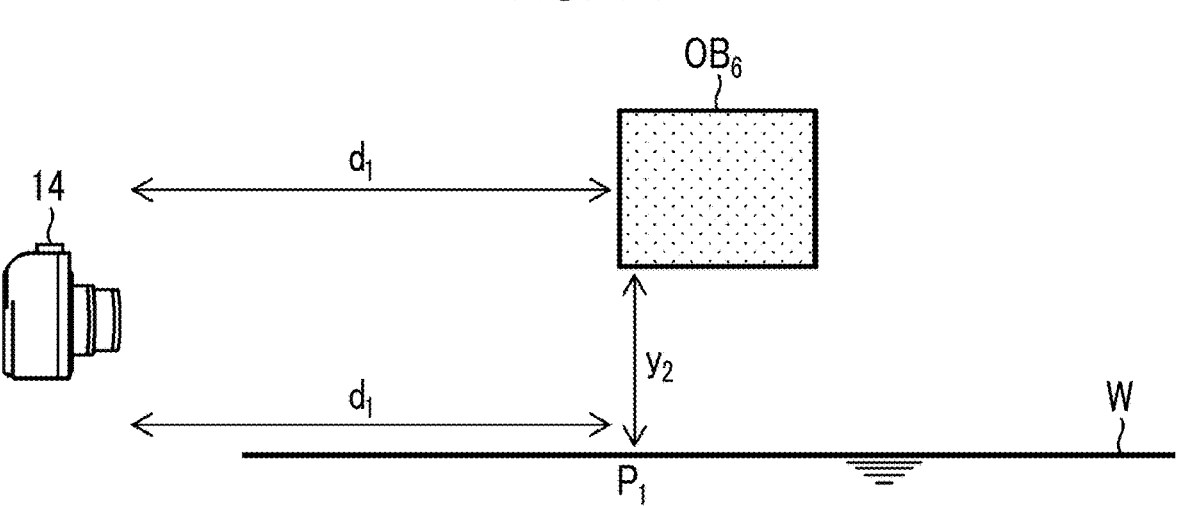
FIG. 14 is a diagram for describing a water surface position immediately below a sign.

Here, the water surface position $P_1$ immediately below the reference object $OB_6$ is a water surface position having the same distance from the imaging unit 14 as the reference object $OB_6$. FIG. 14 is a diagram for describing the water surface position immediately below the reference object $OB_6$. As shown in FIG. 14, in a case in which a distance between the imaging unit 14 and the reference object $OB_6$ is $d_1$, the water surface position $P_1$ immediately below the reference object $OB_6$ is a position at which the distance from the imaging unit 14 is $d_1$.

Here, a multi-eye camera is used as the imaging unit 14, and the water surface position $P_1$ is specified by using a depth map acquired from the multi-eye camera.

In the multi-eye camera, for example, a first camera and a second camera different from the first camera are disposed side by side at a certain distance in a horizontal direction. The water level measurement unit 36 calculates the distance between the multi-eye camera and the reference object $OB_6$ by the principle of triangulation based on the image having a parallax captured by the first camera and the second camera, and generates the depth map. The depth map represents the depth of the image by color. That is, the depth map is information indicating a distance to the multi-eye camera in the image.

Figure 15A:
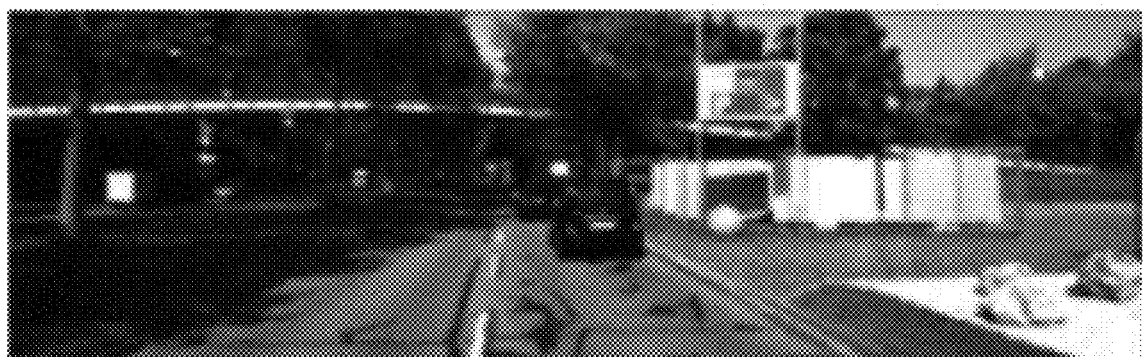
FIGS. 15A and 15B are examples of an image captured by an imaging unit and a depth map generated from the image.
Figure 15B:

FIGS. 15A and 15B are examples of the image captured by the imaging unit 14 and the depth map generated from the image. FIG. 15A is the image captured by the imaging unit 14, and here, the image captured by one camera of the multi-eye cameras is shown. Moreover, FIG. 15B is the depth map generated from the image of FIG. 15A. As shown in FIG. 15B, the pixels at positions having the same distance from the imaging unit 14 in the depth map are represented by the same color.

Therefore, the water level measurement unit 36 acquires the depth map corresponding to the image shown in FIG. 13 and acquires the color of the pixel corresponding to the lower end of the reference object $OB_6$ in this depth map. Further, the water level measurement unit 36 can acquire the water surface position $P_1$ immediately below the reference object $OB_6$ by specifying the position of the pixel of the same color as the color acquired from the region immediately below the reference object $OB_6$.

[Others]

Here, the description has been made using the example in which the imaging unit 14 mounted on the drone 12 captures the inundation situation from the sky above the city, but the imaging unit 14 may be a fixed-point camera or a surveillance camera installed in the city.

The technical scope of the present invention is not limited to the range described in the embodiments described above. The configurations and the like in each embodiment can be appropriately combined between the respective embodiments without departing from the spirit of the present invention.

EXPLANATION OF REFERENCES

10: inundation damage determination system
12: drone
14: imaging unit
16A: processor
16B: memory
16C: communication interface
18: communication network
20: GPS receiver
22: atmospheric pressure sensor
24: azimuth sensor
26: gyro sensor
28: communication interface
30: preprocessing unit
32: reference object detection unit
34: reference position calculation unit
36: water level measurement unit
38: water level storage unit
40: house acquisition unit
42: house water level decision unit
44: inundation damage determination unit
$H_1$, $H_2$: house
$OB_1$ to $OB_6$: reference object
$P_1$: water surface position
W: water surface
S1 to S9: each step of inundation damage determination method

What is claimed is:

1. An inundation damage determination device comprising:

a memory that stores a command to be executed by a processor; and the processor that executes the command stored in the memory, wherein the processor is configured to:

acquire an image including a water surface;

detect a reference object, which is a reference for a height, from the image;

acquire a total length and a position of the reference object;

measure a length above the water surface of the reference object in the image and measure a water level of the water surface from a difference between the total length of the reference object and the length above the water surface of the reference object;

store, as water level history data, the measured water level of the water surface and the position of the reference object in association with each other;

acquire a position of a house which is a target of an inundation damage determination;

search for the water level history data within a certain distance from the position of the house;

in a case where the water level history data within the certain distance from the position of the house is not found, terminate the inundation damage determination; and in a case where the water level history data within the certain distance from the position of the house is found, decide an inundation water level of the house from the found water level history data and determine a degree of damage of the house from the inundation water level; and wherein the processor is configured to, in a case in which a boundary between the reference object and the water surface is not shown in the image, measure a water level of the water surface at the reference object by using a depth map.

2. The inundation damage determination device according to claim 1, wherein the processor is configured to:

acquire a height and an angle of view of a camera that captures the image; and calculate the length above the water surface of the reference object in the image based on the height and the angle of view of the camera.

3. The inundation damage determination device according to claim 2, wherein the processor is configured to:

acquire information of a lens of the camera; and perform distortion correction processing of the lens on the image.

4. The inundation damage determination device according to claim 1, wherein the processor is configured to use, as the inundation water level of the house, a highest water level among the water level history data at a plurality of the reference objects located within the certain distance from the house.

5. The inundation damage determination device according to claim 1, wherein the processor is configured to, in a case in which the image is an image of a plain, divide an area in the image into a plurality of regions and decide the inundation water level of the house from the water level history data at the reference object closest to the house among the reference objects located within the same region as the house.

6. The inundation damage determination device according to claim 1, wherein the processor is configured to decide the inundation water level of the house from the water level history data at the reference object closest to the house among the reference objects located at the same altitude as altitude of the house.

7. The inundation damage determination device according to claim 1, wherein the image is an image captured by a night vision camera.

8. The inundation damage determination device according to claim 1, wherein the image is an image captured by a camera mounted on a flying object.

9. An inundation damage determination method comprising:

acquire an image including a water surface;

detect a reference object, which is a reference for a height, from the image;

acquire a total length and a position of the reference object;

measure a length above the water surface of the reference object in the image and measure a water level of the water surface from a difference between the total length of the reference object and the length above the water surface of the reference object;

store, as water level history data, the measured water level of the water surface and the position of the reference object in association with each other;

acquire a position of a house which is a target of an inundation damage determination;

search for the water level history data within a certain distance from the position of the house;

in a case where the water level history data within the certain distance from the position of the house is not found, terminate the inundation damage determination; and in a case where the water level history data within the certain distance from the position of the house is found, decide an inundation water level of the house from the found water level history data and determine a degree of damage of the house from the inundation water level; and in a case in which a boundary between the reference object and the water surface is not shown in the image, measure a water level of the water surface at the reference object by using a depth map.

10. A non-transitory computer-readable tangible recording medium on which a program for causing, when read by a computer, the computer to execute the inundation damage determination method according to claim 9 is recorded.

11. The inundation damage determination device according to claim 1, wherein the processor is configured to divide an area in the image into a plurality of regions and decide the inundation water level of the house from the water level history data at the reference object closest to the house among the reference objects located within the same region as the house.

* * * * *